(12) United States Patent
Koiwai et al.

(10) Patent No.: US 9,083,241 B2
(45) Date of Patent: Jul. 14, 2015

(54) POWER FACTOR CORRECTION CIRCUIT FOR PROVIDING PROTECTION AGAINST OVERVOLTAGE

(75) Inventors: Hitoshi Koiwai, Saitama (JP); Shigeru Hisada, Saitama (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 39 days.

(21) Appl. No.: 13/982,284

(22) PCT Filed: Jan. 27, 2012

(86) PCT No.: PCT/JP2012/000519
§ 371 (c)(1),
(2), (4) Date: Jul. 29, 2013

(87) PCT Pub. No.: WO2012/105200
PCT Pub. Date: Aug. 9, 2012

(65) Prior Publication Data
US 2013/0308360 A1  Nov. 21, 2013

(30) Foreign Application Priority Data
Jan. 31, 2011  (JP) .................................. 2011-018870

(51) Int. Cl.
*G05F 1/00* (2006.01)
*H02M 7/217* (2006.01)
(Continued)

(52) U.S. Cl.
CPC ............ *H02M 7/217* (2013.01); *H02M 1/4225* (2013.01); *H02M 1/32* (2013.01); *Y02B 70/126* (2013.01)

(58) Field of Classification Search
CPC ... H02M 1/4225; H02M 3/156; H02M 7/217; H02M 2001/0032; H02M 2001/0009; G05F 1/70

USPC ................ 323/222–225, 271–275, 282–285; 363/21.01–21.18, 50–54
See application file for complete search history.

(56) References Cited

U.S. PATENT DOCUMENTS 5,598,092 A * 1/1997 Ohtsuka et al. ............... 323/222
6,721,192 B1 * 4/2004 Yang et al. ................. 363/21.18
(Continued)

FOREIGN PATENT DOCUMENTS

JP    H11-332220 A    11/1999
JP    2000-341957 A   12/2000
(Continued)

OTHER PUBLICATIONS

International Search Report for PCT/JP2012/000519, Apr. 17, 2012.
(Continued)

*Primary Examiner* — Timothy J Dole
*Assistant Examiner* — Yusef Ahmed

(57) ABSTRACT

Provided is a power factor correction circuit capable of reducing ringing sound of a transformer produced when an overshoot protection is effected. An output voltage control circuit performs constant voltage-control such that capacitor charge voltage of an output capacitor corresponds to a first voltage value, and when the capacitor charge voltage of the output capacitor reaches a second voltage value higher than the first voltage value, an overvoltage detecting unit detects the second voltage value. Further, a current limiting unit detects a value of a switching current through a switching element, and determines a limiting value of the level of the switching current. Then, the switching current is limited to the limiting value, and when an overvoltage detecting unit detects the second voltage value, a limiting value changing unit causes the current limiting unit to change the limiting value to decrease the value of the switching current.

6 Claims, 11 Drawing Sheets

(51) Int. Cl.
*H02M 1/42* (2007.01)
*H02M 1/32* (2007.01)

(56) References Cited

U.S. PATENT DOCUMENTS

| | | | |
|---|---|---|---|
| 7,239,532 B1* | 7/2007 | Hsu et al. | 363/21.12 |
| 8,279,631 B2* | 10/2012 | Yang | 363/20 |
| 8,581,518 B2* | 11/2013 | Kuang et al. | 315/307 |
| 2005/0162143 A1* | 7/2005 | Fukumoto et al. | 323/284 |
| 2006/0082352 A1* | 4/2006 | Warita et al. | 323/272 |
| 2007/0164717 A1* | 7/2007 | Osaka | 323/282 |
| 2009/0058383 A1* | 3/2009 | Ryoo | 323/282 |
| 2010/0026262 A1* | 2/2010 | Sase et al. | 323/283 |
| 2010/0039836 A1* | 2/2010 | Gong et al. | 363/21.13 |
| 2010/0079127 A1* | 4/2010 | Grant | 323/285 |
| 2010/0165683 A1* | 7/2010 | Sugawara | 363/126 |
| 2011/0109281 A1* | 5/2011 | Yabuzaki et al. | 323/210 |
| 2011/0110132 A1* | 5/2011 | Rausch et al. | 363/124 |
| 2012/0201063 A1* | 8/2012 | Sugawara | 363/89 |
| 2013/0294118 A1* | 11/2013 | So et al. | 363/21.16 |
| 2014/0160808 A1* | 6/2014 | Sato | 363/21.02 |

FOREIGN PATENT DOCUMENTS

| | | |
|---|---|---|
| JP | 2007-28864 A | 2/2007 |
| JP | 2010-154639 A | 7/2010 |
| JP | 2010-220330 A | 9/2010 |

OTHER PUBLICATIONS

Written Opinion for PCT/JP2012/000519, Apr. 17, 2012.
International Preliminary Report on Patentability for PCT/JP2012/000519, Jul. 31, 2013.

* cited by examiner

POWER FACTOR CORRECTION CIRCUIT FOR PROVIDING PROTECTION AGAINST OVERVOLTAGE

TECHNICAL FIELD

The present invention relates to power factor correction circuits, and in particular to a power factor correction circuit capable satisfying measures to address overshoot of an output voltage and generation of ringing sound in a boosting inductance element and such in a case such as activation, a sudden change of an input, or a sudden change of a load, as well as reduction of a size and a cost of the devices.

BACKGROUND ART

Conventionally, a switch-mode power supply for power factor correction rectifies an alternating input voltage using a bridge diode, and smoothes the rectified output voltage using a capacitor for a booster-type switch-mode power supply. The rectified output from the bridge diode is controlled by a choke coil for the booster-type switch-mode power supply, a switching semiconductor switch for the booster-type switch-mode power supply, a rectifier diode for the booster-type switch-mode power supply, and a power factor correction control circuit, such that a capacitor charge voltage as an output of the smoothing electrolytic capacitor when an inputted current is sinusoidal and a boosting operation is performed becomes an output voltage set by a resistance for setting an output voltage. Accordingly, as a feedback control is typically performed in a booster-type switch-mode power supply so as not to respond to a commercial frequency, an output response to a sudden change of an input and a sudden change of a load may easily delay, and thus overshoot of an output voltage may easily produced.

Thus, as illustrated in FIG. 9, a conventional technique described in Patent Literature 1 proposes a direct-current source circuit provided with: a rectifying means (D10 in FIG. 9) for rectifying and smoothing a commercial alternating-current source; a boosting inductance element (L10 in FIG. 9); a switching means (Q10 in FIG. 9) for connecting and disconnecting a current through the inductance; a direct voltage generating means (C20 in FIG. 9) for rectifying and smoothing an output from the switching means to obtain a direct output voltage; a switch control means (an output voltage control circuit, an oscillation control unit, and a driver in FIG. 9) for variably controlling a switching frequency of the switching means based on an excitation voltage of the inductance element and the output, and at least stabilizing an output from the direct-current source circuit; and a switching operation stopping means (an overvoltage detecting unit and an overcurrent detecting unit in FIG. 9) configured to detect a voltage level corresponding to the commercial alternating-current source and to stop a switching operation of the switching means when the voltage level is higher than a predetermined threshold value. According to this direct-current source circuit, when the voltage level of the commercial alternating-current source is equal to or higher than the predetermined, the switching operation of the switching means in an active filter is stopped. With this, under a condition such that the commercial alternating-current source is a high voltage and with a light load, for example, it is possible to avoid an excessive increase of the voltage in the inductance element.

However, according to the conventional technique described in Patent Literature 1, as illustrated in FIG. 10 (FIG. 11 is a timing chart showing a timing chart in FIG. 9 in a wider timeline), in activation when the commercial alternating-current source is applied to the input of the direct-current source circuit, it is probable that an output voltage steeply increases and an intermittent oscillating operation of repeatedly oscillating and stopping oscillating may occur. If a cycle of repeating oscillating and stopping oscillating is within an audible region, a ringing sound may be possibly produced from the boosting inductance element and the like. Such a phenomenon is particularly noticeable when an input voltage is higher than an output voltage.

In contrast, a conventional technique described in Patent Literature 2 proposes a boost-chopper-type power factor correction power-supply device capable of setting a level of the output direct voltage to be a predetermined value, and correcting a power factor, and provided with: a rectifier for rectifying an inputted alternating voltage to obtain an pulsating voltage; a first switch element for applying the pulsating voltage to an inductor to supply a current for storing a magnetic energy; a second switch element for supplying a current corresponding to the magnetic energy; a smoothing capacitor for smoothing the current from the second switch element to obtain an output direct voltage; and a switch element controller for controlling switching between disconnection and conduction of the first switch element. According to the boost-chopper-type power factor correction power-supply device, an overvoltage detection signal is generated when the level of the pulsating voltage is higher than a predetermined threshold value, and the level of the output direct voltage is changed to be higher than the predetermined value based on the overvoltage detection signal.

Therefore, according to the boost-chopper-type power factor correction power-supply device, the rectifier rectifies the inputted alternating voltage and obtains the pulsating voltage, the first switch element applies the pulsating voltage to the inductor and supplies the current for storing the magnetic energy, and the second switch element supplies the current corresponding to the magnetic energy. The smoothing capacitor smoothes of the current from the second switch and obtains the output direct voltage, and the switch element controller controls between disconnection and conduction of the first switch element. Then, the output direct voltage is set to be the predetermined value, and the power factor is corrected. Further, the overvoltage detection signal is generated when a peak value of the pulsating voltage is higher than the predetermined threshold value, and the value of the output direct voltage is changed to a level higher than the predetermined value based on the overvoltage detection signal. With this, a current is prevented from being intermittently supplied to the inductor. Therefore, according to the boost-chopper-type power factor correction power-supply device disclosed in Patent Literature 2, generation of ringing sound in the boosting inductance element and the like in the direct-current source circuit of Patent Literature 1 is prevented.

CITATION LIST

Patent Literature
Patent Literature 1: Japanese Unexamined Patent Application Publication No. H11-332220
Patent Literature 2: Japanese Unexamined Patent Application Publication No. 2007-28864

SUMMARY OF THE INVENTION

Technical Problem

However, as the boost-chopper-type power factor correction power-supply device disclosed in Patent Literature 2 generates the overvoltage detection signal when the peak value of the pulsating voltage is higher than the predetermined threshold value and changes the value of the output direct voltage to be higher than the predetermined value based on the overvoltage detection signal, it is necessary to provide a design considering a voltage resistance of peripheral components in view of the fact that the output voltage increases for a certain period of time. Therefore, the boost-chopper-type power factor correction power-supply device according to Patent Literature 2 poses a problem that it is difficult to reduce a size and a cost of devices.

As described above, according to the conventional techniques described above, it is difficult to provide a power factor correction circuit capable of satisfying measures to address overshoot of an output voltage and generation of ringing sound in a boosting inductance element and such, as well as reduction of both of a size and a cost of the devices.

Thus, the present invention is made in view of the above problem, relating to power factor correction circuits, and in particular aims to provide a power factor correction circuit capable of reducing ringing sound of a transformer produced when an overshoot protection is effected in a case such as activation, a sudden change of an input, or a sudden change of a load.

Solution to Problem

In order to address the above problem, the present invention proposes the following matters. It should be noted that for the sake of facilitation of understanding, the description is given with reference numerals corresponding to, but not limited to, those added to components in embodiments of the present invention.

(1) The present invention proposes a power factor correction circuit provided with: an input diode configured to rectify commercial input power (e.g., corresponding to D1 in FIG. 1); a choke coil having one terminal connected to the input diode (e.g., corresponding to L1 in FIG. 1); an output diode having an anode terminal connected to the other terminal of the choke coil (e.g., corresponding to D2 in FIG. 1); an output capacitor having a positive terminal connected to a cathode terminal of the output diode (e.g., corresponding to C4 in FIG. 1); a switching element connected between a contact point and a negative terminal of the output capacitor, the contact point locating between the anode terminal of the output diode and the other terminal of the choke coil (e.g., corresponding to Q1 in FIG. 1); and a control circuit configured to control turning on and off of the switching element (e.g., corresponding to a control circuit 10 in FIG. 1), wherein a voltage of the commercial input power is boosted, a direct voltage from the output capacitor is outputted, and electricity is supplied to a load side, and the control circuit includes: an output voltage control circuit configured to constant voltage-control a capacitor charge voltage of the output capacitor to be a first voltage value (e.g., corresponding to an output voltage control circuit 300 in FIG. 2); an overvoltage detecting unit configured to detect a second voltage value to generate a first overvoltage detection signal, when the capacitor charge voltage of the output capacitor reaches the second voltage value higher than the first voltage value (e.g., corresponding to an overvoltage detecting unit 400 in FIG. 2); a current limiting unit configured to detect a value of a switching current through the switching element, determine a limiting value of the switching current, and limit the value of the switching current to the limiting value (e.g., corresponding to a current limiting unit 500 in FIG. 2); and a limiting value changing unit configured to cause the current limiting unit to change the limiting value to decrease the value of the switching current based on the first overvoltage detection signal when the overvoltage detecting unit has detected the second voltage value (e.g., corresponding to a limiting value changing unit 600 in FIG. 2).

According to the invention, the output voltage control circuit performs constant voltage-control such that the capacitor charge voltage of the output capacitor corresponds to the first voltage value, and when the capacitor charge voltage of the output capacitor reaches the second voltage value higher than the first voltage value, the overvoltage detecting unit detects the second voltage value. Further, the current limiting unit detects the value of the switching current through the switching element, and the limiting value of the switching current is determined. Then, the switching current is limited to the limiting value, and when the overvoltage detecting unit detects the second voltage value, the limiting value changing unit causes the current limiting unit to change the limiting value so as to decrease the value of the switching current.

(2) The present invention proposes the power factor correction circuit according to (1), wherein when the overvoltage detecting unit detects that the capacitor charge voltage of the output capacitor is higher than the second voltage value after the overvoltage detecting unit has detected the second voltage value, the limiting value changing unit causes the current limiting unit to change the limiting value so as to further decrease the value of the switching current to be lower than the value of the switching current caused to decrease when the overvoltage detecting unit detects the second voltage value.

According to the invention, when the overvoltage detecting unit detects that the capacitor charge voltage of the output capacitor is higher than the second voltage value after the overvoltage detecting unit has detected the second voltage value, the current limiting unit is caused to change the limiting value so as to further decrease the level of the switching current to be lower than the value of the switching current caused to decrease when the overvoltage detecting unit detects the second voltage value.

(3) The present invention proposes the power factor correction circuit according to (2), wherein the current limiting unit is constituted by a comparator having: a negative terminal connected to a reference power source corresponding to the first voltage value; an output connected to an oscillation control unit configured to control oscillation of the switching element (e.g., corresponding to a COMP 501 in FIG. 3); and a positive terminal supplied with a signal obtained by superimposing a current level signal corresponding to the value of the switching current and a limiting value changing signal outputted from the limiting value changing unit for causing the current limiting unit to change the limiting value.

According to the invention, the current limiting unit is constituted by a comparator having: the negative terminal connected to the reference power source corresponding to the first voltage value; the output connected to the oscillation control unit configured to control oscillation of the switching element; and the positive terminal supplied with the signal obtained by superimposing the current level signal corresponding to the value of the switching current and the limiting value changing signal outputted from the limiting value changing unit for causing the current limiting unit to change the limiting value.

(4) The present invention proposes the power factor correction circuit according to either (1) or (2), wherein the control circuit includes an oscillation latch unit configured to discontinue and hold a switching operation of the switching element (e.g., corresponding to an oscillation control unit 210 in FIG. 6), and when the capacitor charge voltage of the output capacitor reaches a third voltage value higher than the second voltage value, the overvoltage detecting unit detects the third voltage value to generate a second overvoltage detection signal, and controls the oscillation latch unit discontinues and holds the switching of the switching element based on the second overvoltage detection signal.

According to the invention, when the capacitor charge voltage of the output capacitor reaches the third voltage value higher than the second voltage value, the control circuit causes the overvoltage detecting unit to detect the third voltage value, and the oscillation latch unit to discontinue and hold the switching of the switching element.

(5) The present invention proposes the power factor correction circuit according to one of (1) to (4), wherein the control circuit includes a limiting value change end transmission unit configured to transmit a limiting value change end signal to the load side at timing when a state in which the limiting value changing unit has caused the current limiting unit to change the limiting value resumes to a state before the change, the limiting value change end signal indicating an end of the change of the limiting value (e.g., corresponding to a limiting value change end transmission unit 700 in FIG. 8).

According to the invention, the control circuit is configured such that the limiting value change end signal indicating that the change of the limiting value has ended is transmitted to the load side at the timing when the state in which the limiting value changing unit causes the current limiting unit to change the limiting value resumes to the state before the change.

Effects of Invention

According to the invention of the claim 1, the output voltage control circuit performs constant voltage-control such that the capacitor charge voltage of the output capacitor corresponds to the first voltage value, and when the capacitor charge voltage of the output capacitor reaches the second voltage value higher than the first voltage value, the overvoltage detecting unit detects the second voltage value. Further, the current limiting unit detects the value of the switching current through the switching element, the limiting value of the level of the switching current is determined along with this, and the value of the switching current is limited to the limiting value. Then, when the overvoltage detecting unit detects the second voltage value, the limiting value changing unit causes the current limiting unit to change the limiting value so as to decrease the level of the switching current. Accordingly, an effect is provided that even under a condition that the output voltage of the booster-type switch-mode power supply is susceptible to overshoot, it is possible to decrease the switching current comparatively easily when the output voltage is in an overshoot state. As a result, an effect is provided that it is possible to suppress an increase of the output voltage, and to prevent generation of ringing sound in a transformer. In addition, an effect is provided that as a complicated control circuit is not required, it is possible to provide a booster-type switch-mode power supply capable of satisfying reduction of both of a size and a cost of the devices.

According to the invention of the claim 2, even under the condition that the output voltage of the booster-type switch-mode power supply is susceptible to overshoot, it is possible to further decrease the switching current comparatively easily when the output voltage is in the overshoot state. As a result, an effect is provided that it is possible to further suppress the output voltage, and to further prevent generation of ringing sound in the transformer. In particular, when a self-excited power source is used, there is a case in which an intermittent oscillation operation in an audible frequency band occurs under a condition of a light load. However, as the value of the switching current is decreased even lower than that in the case in which the overvoltage detecting unit detects the second voltage value, an effect is provided that it is also possible in this case to reduce the generation of ringing sound in the transformer. It should be noted that while there is a case in which a continuous oscillation occurs instead of an intermittent operation under the condition of a light load when a self-excited power source is used, it should be understood that the effect is also provided that it is possible in this case to reduce the generation of ringing sound in the transformer.

According to the invention of the claim 3, the current limiting unit is constituted by a comparator having: the negative terminal connected to the reference power source corresponding to the first voltage value; the output connected to the oscillation control unit configured to control oscillation of the switching element; and the positive terminal supplied with the signal obtained by superimposing the current level signal corresponding to the value of the switching current and the limiting value changing signal outputted from the limiting value changing unit for causing the current limiting unit to change the limiting value. Therefore, an effect is provided that it is possible to change the limiting value by changing a threshold value equivalently with a simple mode of connecting an output signal from the limiting value changing unit to the positive terminal of an overcurrent detecting circuit configured by a common comparator.

According to the invention of the claim 4, an effect is provided that the overvoltage detecting unit detects the third voltage value when the capacitor charge voltage of the output capacitor reaches the third voltage value higher than the second voltage value, and controls the oscillation control unit to discontinue and hold the switching of the switching element. Thus, even when the output voltage is in the overshoot state and increases up to the third voltage value, it is possible to stop the power factor correction circuit reliably and easily.

According to the invention of the claim 5, the control circuit is configured such that the limiting value change end signal indicating that the change of the limiting value has ended is transmitted to the load side at the timing when the state in which the limiting value changing unit causes the current limiting unit to change the limiting value resumes to the state before the change. Accordingly, as the information that the current limiting level of the switching current is limited to the limiting value is transmitted to the load side, an effect is provided that when another electric circuit is connected to the output of the power factor correction circuit according to the present invention, for example, it is possible to prohibit the operation of this electric circuit even when the output voltage of the power factor correction circuit is not stably constant voltage-controlled at the first voltage value by controlling an operation of the electric circuit based on the limiting value change end information.

DETAILED DESCRIPTION OF PREFERRED EMBODIMENTS

Hereinafter, embodiments of the present invention will be described in detail with reference to the drawings.

It should be noted that components in the embodiments are replaced by existing components and the like as needed, and there may be wide variations including combinations with other existing components. Therefore, the description of the embodiments will not restrict contents of the invention defined in the claims.

In the following, a power factor correction circuit according to the present invention will be described in detail with reference to FIG. 1 and FIG. 8. It should be noted that, the power factor correction circuit according to the embodiments is configured to apply alternating-current power of 100 V (effective value), take out direct-current power of a 300-V output direct voltage from between an output terminal VOUT and a terminal GND, and supply the voltage to a load.

<Circuit Configuration of Power Factor Correction Circuit>

A circuit configuration of the power factor correction circuit according to the embodiments will be described with reference to FIG. 1.

Figure 1:
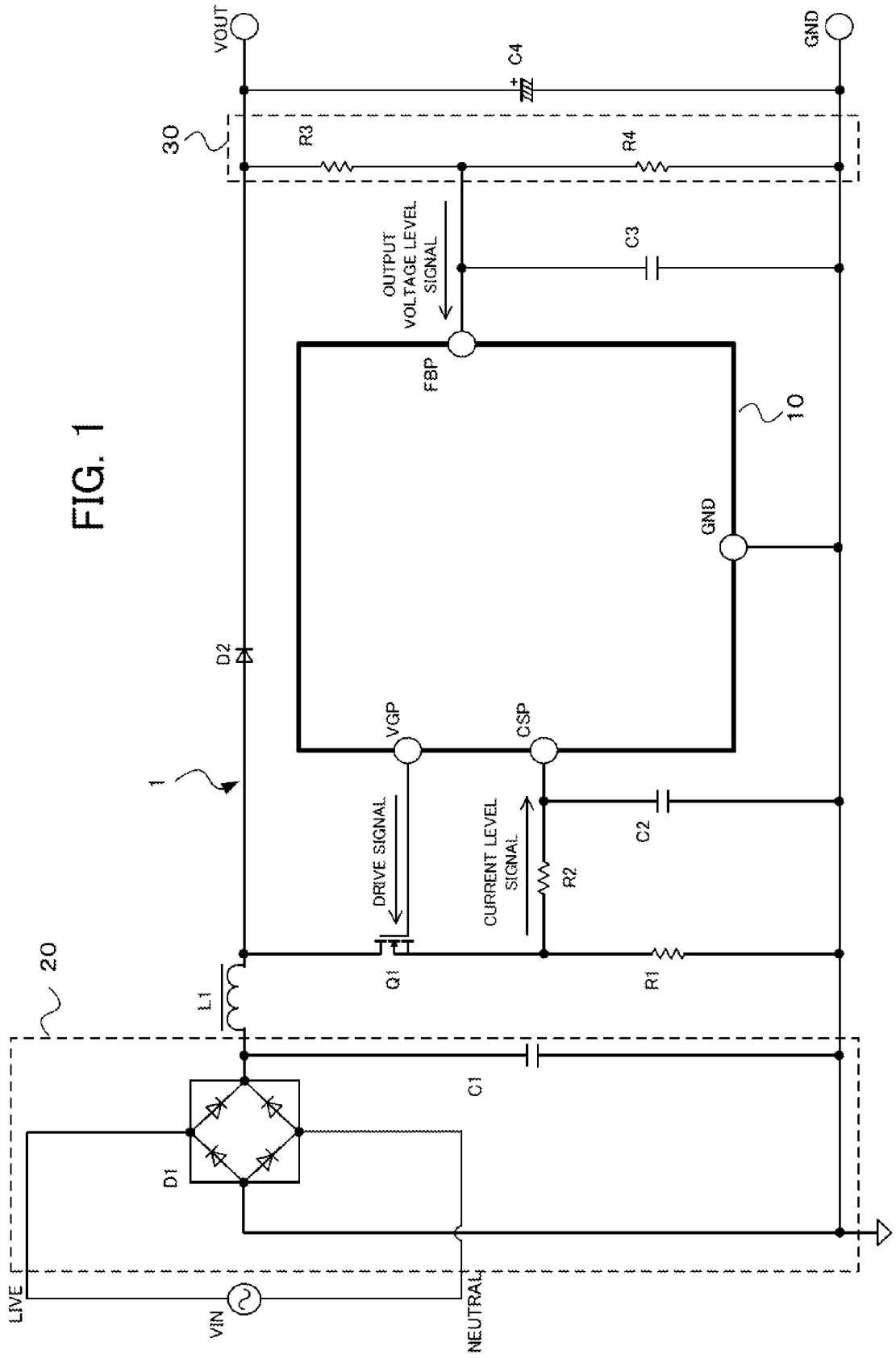
FIG. 1 is a diagram illustrating a circuit configuration of a power factor correction circuit according to embodiments of the present invention.

Referring to FIG. 1, the power factor correction circuit according to the embodiments is provided with: a commercial power source VIN configured to supply alternating-current power; a rectifier circuit 20 including a bridge rectifier circuit D1 having four diodes in bridge connection and configured to perform full-wave rectification to an alternating voltage and a rectifier capacitor C1 configured to smooth an output from the bridge rectifier circuit D1; a choke coil L1; a switching element Q1; resistances R1, R2, R3, and R4; capacitors C2, C3, and C4; a control circuit 10; and a diode D2.

The commercial power source VIN configured to supply alternating-current power is connected to an input side of the bridge rectifier circuit D1. An output side of the bridge rectifier circuit D1 is connected to one terminal of the smoothing capacitor C1 and one terminal of the choke coil L1. It should be noted that the other terminal of the smoothing capacitor C1 is grounded. Further, the choke coil L1 has a function of storing and discharging a magnetic energy.

The other terminal of the choke coil L1 is connected to a source of the switching element Q1 and to an anode of the diode D2. A gate of the switching element Q1 is connected to a VGP terminal of the control circuit 10, and operated based on a drive signal supplied from the VGP terminal. A drain of the switching element Q1 is connected to one terminals of the resistances R1 and R2, the other terminal of the resistance R2 is connected to one terminal of the capacitor C2 and a CSP terminal of the control circuit 10, and a current level signal is supplied to the control circuit 10 through the resistance R2. It should be noted that both of the other terminals of the resistance R1 and the capacitor C2 are grounded.

A cathode of the diode D2 is connected to the output terminal VOUT. Further, between the output terminal VOUT and the ground, a voltage-dividing circuit constituted by the resistances R3 and R4 and the output capacitor C4 are provided. Moreover, a contact point between the resistances R3 and R4 constituting the voltage-dividing circuit is connected to an FBP terminal of the control circuit 10, and an output voltage level signal is supplied from the voltage-dividing circuit to the control circuit 10. Furthermore, between the FBP terminal of the control circuit 10 and the ground, the capacitor C3 is provided.

First Embodiment

The first embodiment of the present invention will be described with reference to FIG. 2 through FIG. 5. It should be noted that according to this embodiment, when an output voltage exceeds a second voltage value, a switching current is suppressed to a current value lower than that in OCP (overcurrent detection).

<Configurational Blocks within Control Circuit>

Configurational blocks of the control circuit according to this embodiment will be described with reference to FIG. 2.

Figure 2:
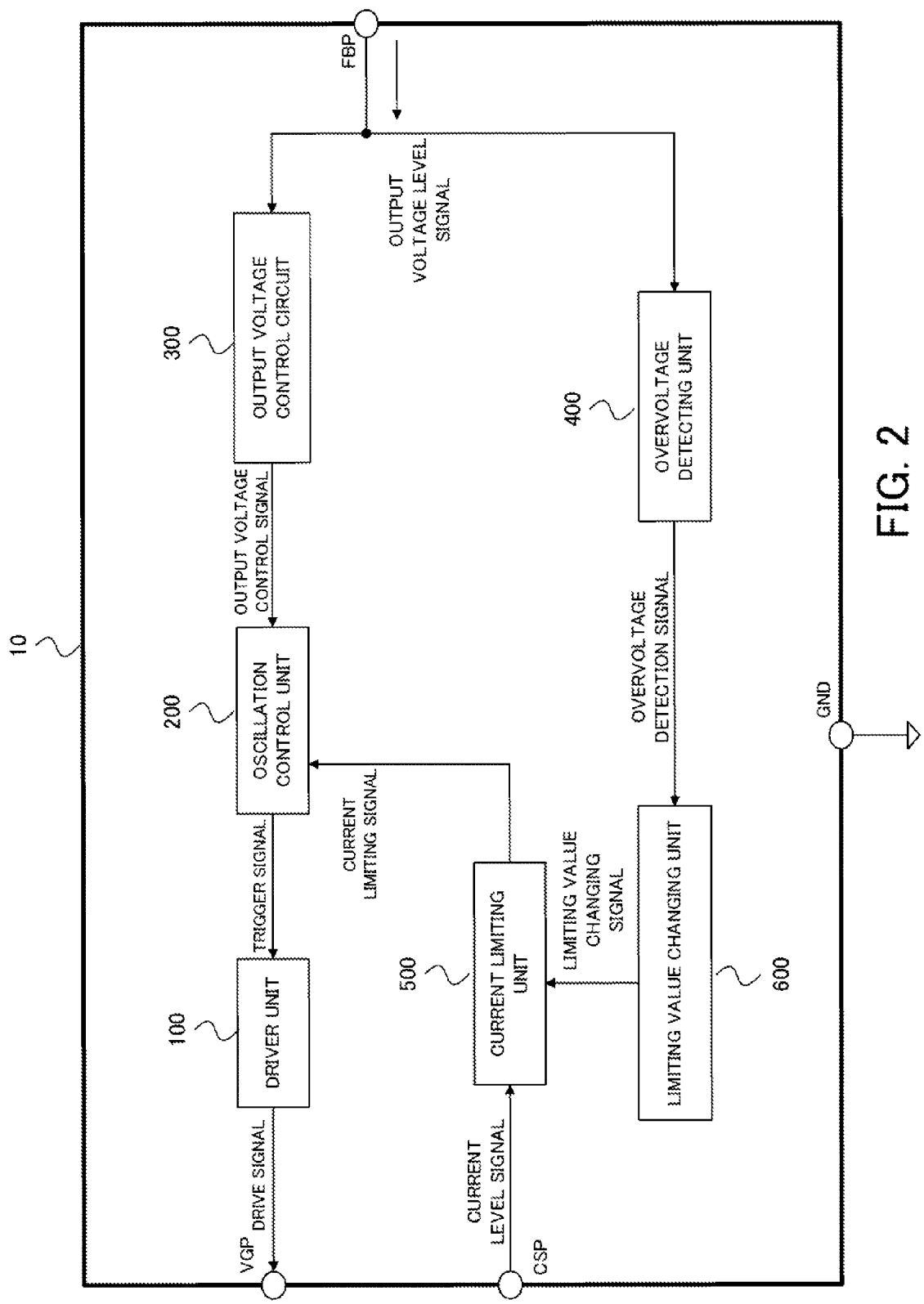
FIG. 2 is a first circuit block diagram of a control circuit used in the power factor correction circuit according to the first embodiment.

Referring to FIG. 2, the control circuit 10 according to this embodiment is provided with a driver unit 100, an oscillation control unit 200, an output voltage control circuit 300, an overvoltage detecting unit 400, a current limiting unit 500, and a limiting value changing unit 600.

Here, the output voltage control circuit 300 performs constant voltage-control such that the value of the output voltage corresponds to a first voltage value by inputting an output voltage level signal corresponding to a capacitor charge voltage of the output capacitor C4 through the FBP terminal, and by outputting an output voltage control signal to the oscillation control unit 200 based on the inputted output voltage level signal.

In a steady state, the oscillation control unit 200 generates a trigger signal for controlling oscillation according to the output voltage control signal inputted from the output voltage control circuit 300, and supplies the trigger signal to the driver unit 100. The driver unit 100 generates a drive signal according to the trigger signal inputted from the oscillation control unit 200, and supplies the drive signal to the gate of the switching element Q1 via the VGP terminal.

On the other hand, when the output voltage level signal corresponding to the capacitor charge voltage of the output capacitor C4 has been inputted through the FBP terminal, and the inputted output voltage level signal has reached a second voltage value higher than the first voltage value, the overvoltage detecting unit 400 detects the second voltage value, generates an overvoltage detection signal, and supplies the overvoltage detection signal to the limiting value changing unit 600.

When the overvoltage detecting unit 400 has detected the second voltage value, the limiting value changing unit 600 outputs a limiting value changing signal for causing the current limiting unit 500 to change a limiting value so as to decrease the value of the current. The current limiting unit 500 determines the limiting value of the current based on a voltage value obtained by superimposing the limiting value changing signal on the inputted current level signal and based on a reference voltage value, and limits the current value to the limiting value.

<Circuit Configurations of Main Components within Control Circuit>

Figure 3:
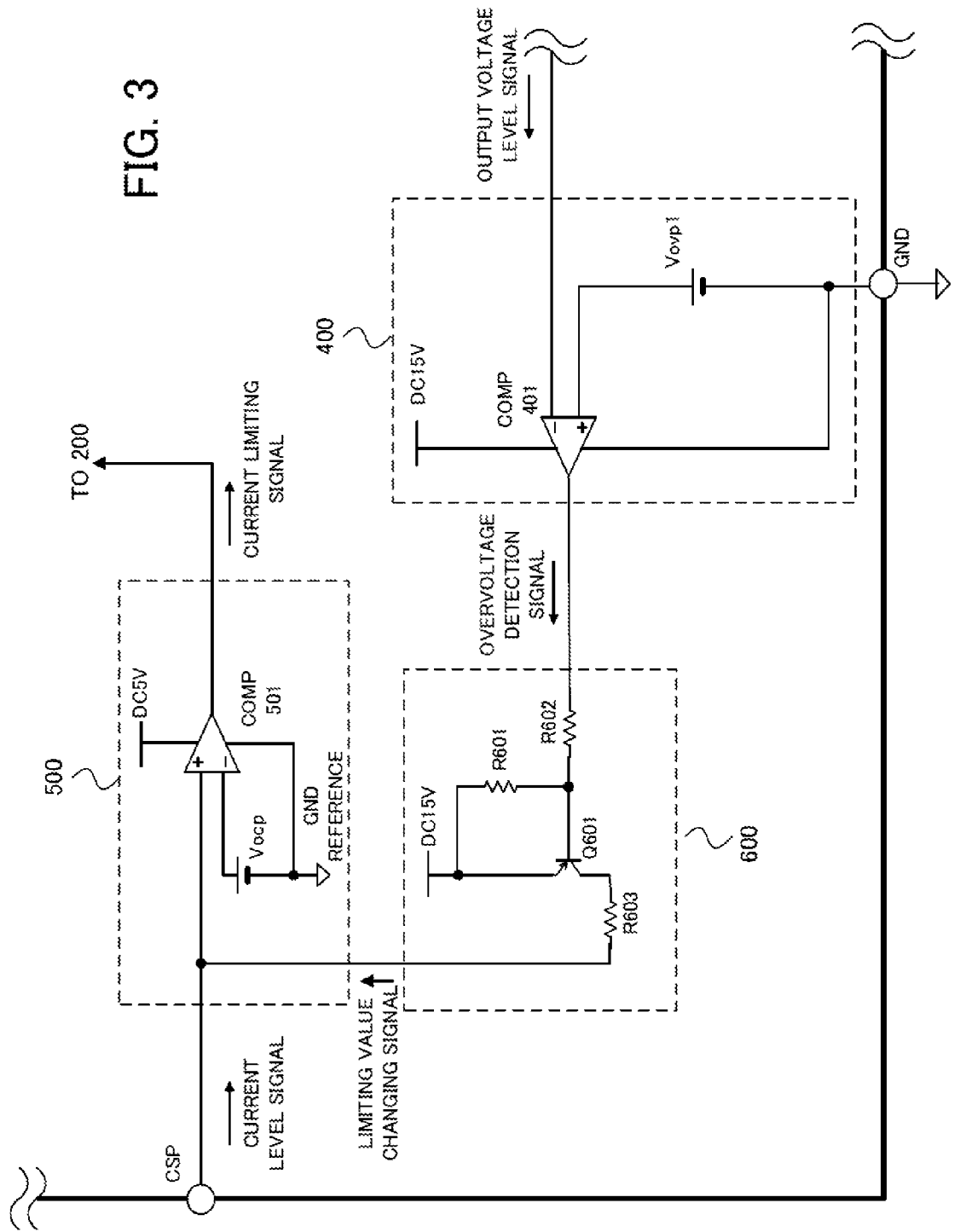
FIG. 3 is a peripheral circuitry configurational diagram of an overvoltage detecting unit, a current limiting unit, and a limiting value changing unit in the control circuit according to the first embodiment.

Circuit configurations of main components within the control circuit according to this embodiment will be described with reference to FIG. 3. The circuit configurations of the main components (the overvoltage detecting unit 400, the current limiting unit 500, and the limiting value changing unit 600) within the control circuit 10 according to this embodiment are as illustrated in FIG. 3.

Specifically, the overvoltage detecting unit 400 is provided with a comparator COMP 401, and a second voltage source Vovp corresponding to the second voltage value. A negative input terminal of the comparator COMP 401 is connected to the FBP terminal of the control circuit 10, and supplied with the output voltage level signal. A positive input terminal of the comparator COMP 401 is connected to the second voltage source Vovp. Further, an output terminal of the comparator COMP 401 generates a Low-level overvoltage detection signal when the output voltage is in an overvoltage state, and outputs the signal to the limiting value changing unit 600.

The limiting value changing unit 600 is provided with resistances R601, R602, and R603, and a transistor Q601. One terminal of the resistance R602 is connected to the output terminal of the comparator COMP 401 within the overvoltage detecting unit 400. The other terminal of the resistance R602 is connected to a based of the transistor Q601 and one terminal of the resistance R601. The other terminal of the resistance R601 is connected to a power source and an emitter of the transistor Q601. One terminal of the resistance R603 is connected to a collector of the transistor Q601, and the other terminal of the resistance R603 is connected to the current limiting unit 500. Further, when a Low-level signal is outputted from the output terminal of the comparator COMP 401 within the overvoltage detecting unit 400, the transistor Q601 is turned to an ON state, and a High-level signal is outputted to the current limiting unit 500. In addition, a level of the High-level signal outputted to the current limiting unit 500 is set by the resistance R603.

The current limiting unit 500 is provided with a comparator COMP 501 and a reference voltage source Vocp. A negative input terminal of the comparator COMP 501 is connected to the reference voltage source Vocp. A positive input terminal of the comparator COMP 501 is connected to the CSP terminal of the control circuit and an output terminal of the limiting value changing unit 600.

When the output voltage is not in the overvoltage state, the current limiting unit 500 compares the current level signal supplied from the CSP terminal with a value of the reference voltage source Vocp, and if a value of the current level signal is higher than the value of the reference voltage source Vocp, outputs a High-level current limiting signal to the oscillation control unit 200 to stop oscillation.

On the other hand, when the output voltage is in the overvoltage state, the current limiting unit 500 compares a level of a signal obtained by superimposing the limiting value changing signal supplied from the limiting value changing unit 600 on the current level signal supplied from the CSP terminal with the value of the reference voltage source Vocp, thereby equivalently functioning to decrease a threshold value, and if the output voltage exceeds the second voltage value, outputs an output signal from the COMP 501 to the oscillation control unit 200. With this, the current limiting unit 500 controls to cause the oscillation control unit 200 to decrease the switching current.

Figure 4:
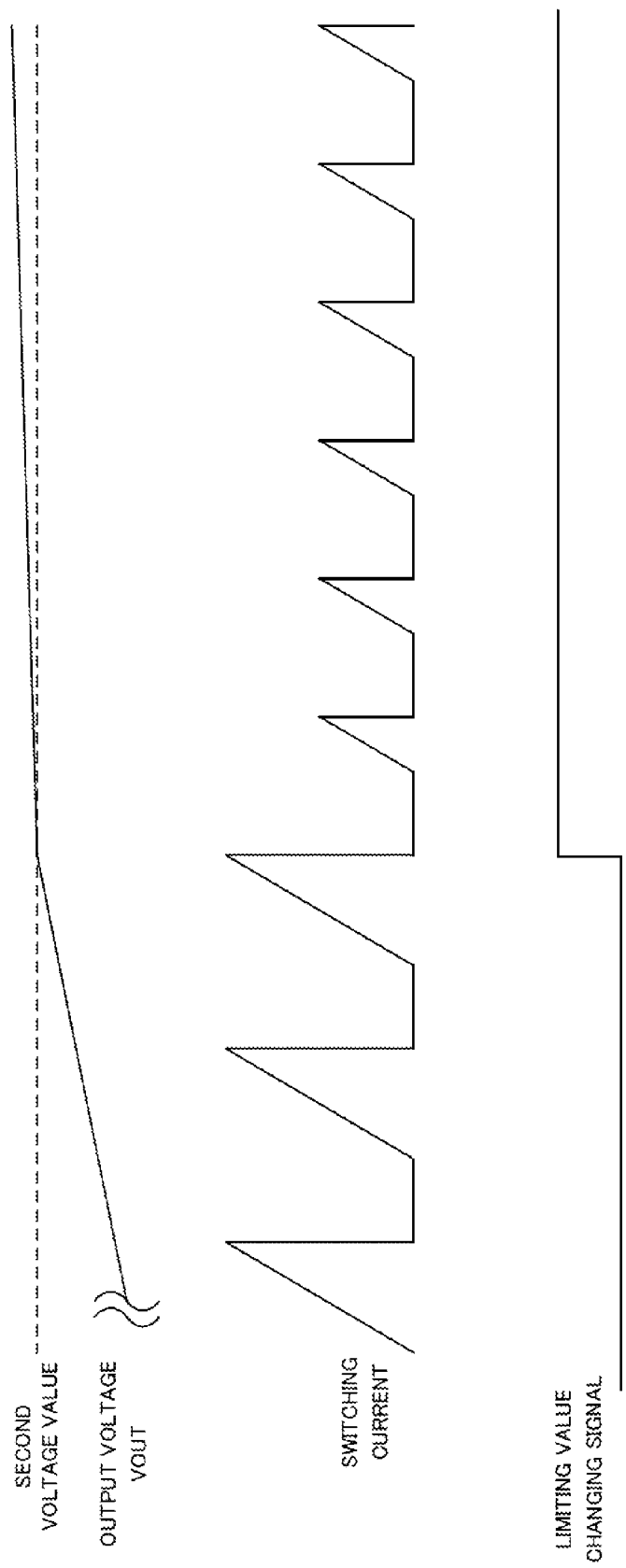
FIG. 4 is a chart showing a timing chart including an actual switching current waveform in a wider timeline when activating the power factor correction circuit according to the first embodiment with a light load.
Figure 5:
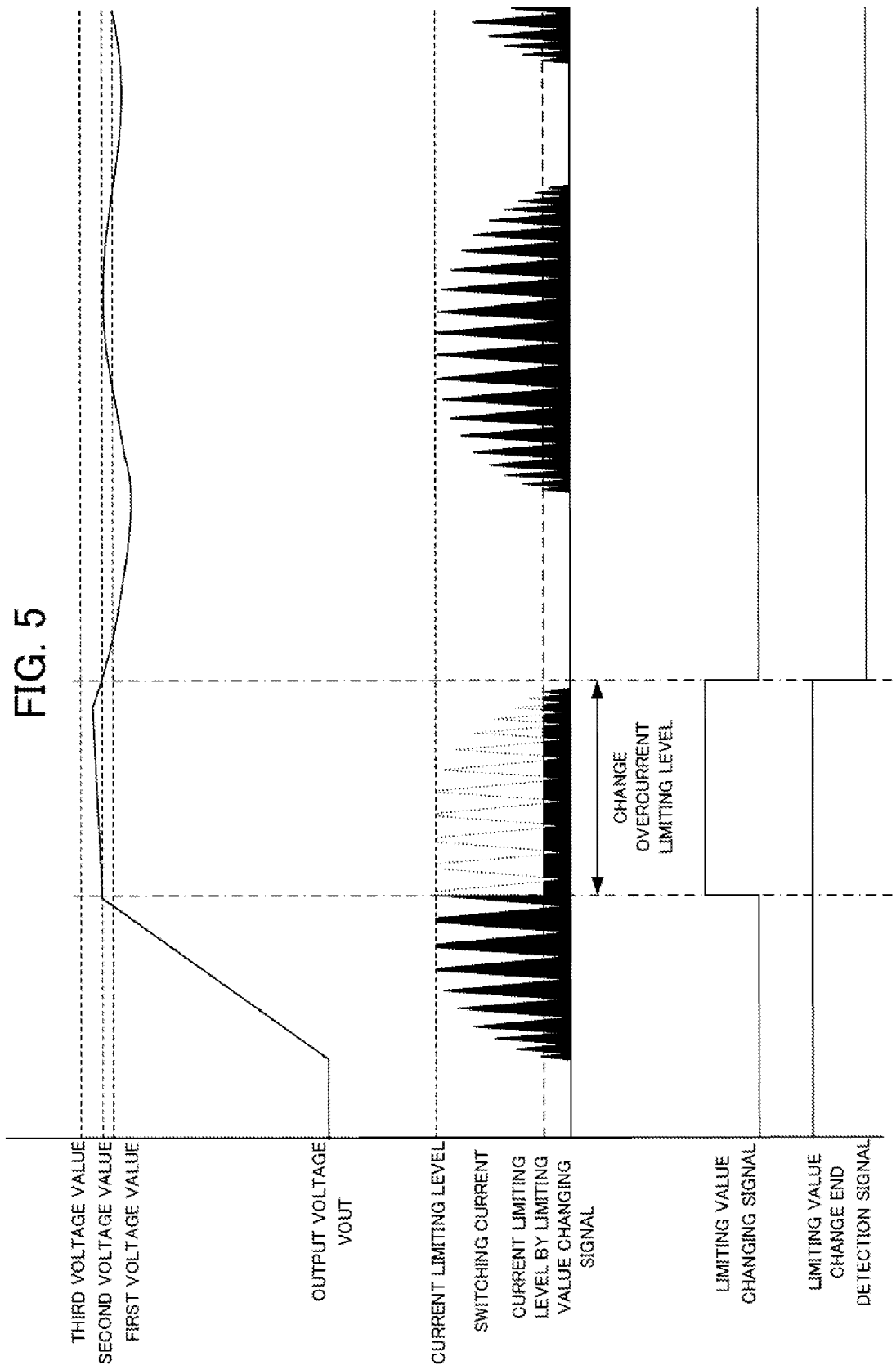
FIG. 5 is an operational timing chart including an average switching current waveform when activating the power factor correction circuit according to the first embodiment with a light load.

In other words, as illustrated in FIG. 3 through FIG. 5, when the output voltage exceeds the second voltage value, the overvoltage detecting unit 400 generates the Low-level overvoltage detection signal and outputs this signal to the limiting value changing unit 600. In the limiting value changing unit 600, when a Low-level signal is outputted from the output terminal the comparator COMP 401 within the overvoltage detecting unit 400, the transistor Q601 is turned to the ON state, and a High-level signal set by the resistance R603 is outputted to the current limiting unit 500.

Then, to the positive input terminal of the COMP 501 within the current limiting unit 500, the signal obtained by superimposing the current level signal set by the resistance R603 within the limiting value changing unit 600 and the limiting value changing signal is inputted. On the other hand, to the negative input terminal of the COMP 501, the static reference voltage source Vocp is connected. Therefore, the threshold value decreases equivalently. As oscillation stops when the threshold value decreases and the current limiting unit 500 outputs the current limiting signal to the oscillation control unit 200, the current decreases and the level of the current level signal drops.

Then, the signal level at the positive input terminal of the COMP 501 decreases, and if drops down below the value of the reference voltage source Vocp, supply of the current limiting signal to the oscillation control unit 200 stops. With this, when the oscillation control unit 200 starts oscillation, the current increases, and the level of the current level signal rises. With this, when the signal level at the positive input terminal of the COMP 501 increases and exceeds the reference voltage source Vocp, the current limiting signal is supplied to the oscillation control unit 200. The above operation is repeated until the output voltage becomes lower than the second voltage value.

It should be noted that as it is configured such that the threshold value decreases equivalently, the switching current during a period in which the limiting value changing signal is at High level shows a waveform having the same inclination and a lower crest value, as illustrated in FIG. 4. Further, as it is configured such that the threshold value decreases, it is turned to be an oscillation stopping state as soon as the oscillation starts, and a frequency of the waveform of the switching current is shorter than usual. FIG. 5 shows the switching current by an average current when the limiting value changing signal is at High level. As illustrated here, it can be seen that even when the limiting value changing signal is at High level, the oscillation does not stop at all and the current level is suppressed low.

Therefore, according to this embodiment, the output voltage control circuit performs constant voltage-control such that the capacitor charge voltage of the output capacitor corresponds to the first voltage value, and when the capacitor charge voltage of the output capacitor reaches the second voltage value higher than the first voltage value, the overvoltage detecting unit detects the second voltage value. Further, the current limiting unit detects the value of the switching current through the switching element, the limiting value of the level of the switching current is determined along with this, and the value of the switching current is limited to the limiting value. Then, when the overvoltage detecting unit detects the second voltage value, the limiting value changing unit causes the current limiting unit to change the limiting value so as to decrease the level of the switching current. Accordingly, even under a condition that the output voltage of the booster-type switch-mode power supply is susceptible to overshoot, it is possible to decrease the switching current comparatively easily by setting the resistance R603 when the output voltage is in an overshoot state. It should be noted that when the output voltage is in the overshoot state, the level of the switching current is set such that the output voltage is equal to or lower than a third voltage value. As a result, it is possible to suppress an increase of the output voltage, and to prevent generation of ringing sound in a transformer. In addition, as a complicated control circuit is not required, it is possible to provide a booster-type switch-mode power supply capable of satisfying reduction of both of a size and a cost of the devices.

Further, even under the condition that the output voltage of the booster-type switch-mode power supply is susceptible to overshoot, it is possible to further decrease the switching current comparatively easily by setting the resistance R603 when the output voltage is in the overshoot state. As a result, it is possible to further suppress the output voltage, and to further prevent generation of ringing sound in the transformer. In addition, if the power factor correction circuit 1 is a self-excited power source, for example, there is a case in which an intermittent oscillation operation in an audible frequency band occurs under a condition of a light load. However, as the value of the switching current is decreased even lower than that in the case in which the overvoltage detecting unit 400 detects the second voltage value, it is also possible in this case to reduce the generation of ringing sound in the transformer. It should be noted that while there is a case in which a continuous oscillation occurs instead of an intermittent operation under the condition of a light load when the power factor correction circuit 1 is a self-excited power source, it should be understood that it is possible in this case to reduce the generation of ringing sound in the transformer.

Second Embodiment

The second embodiment of the present invention will be described with reference to FIG. 6 and FIG. 7. It should be noted that according to this embodiment, when the overvoltage detecting unit detects the third voltage value that is higher than the second voltage value, the switching of the switching element is controlled to be discontinued and held.

<Configurational Blocks within Control Circuit>

Configurational blocks of the control circuit according to this embodiment will be described with reference to FIG. 6.

Figure 6:
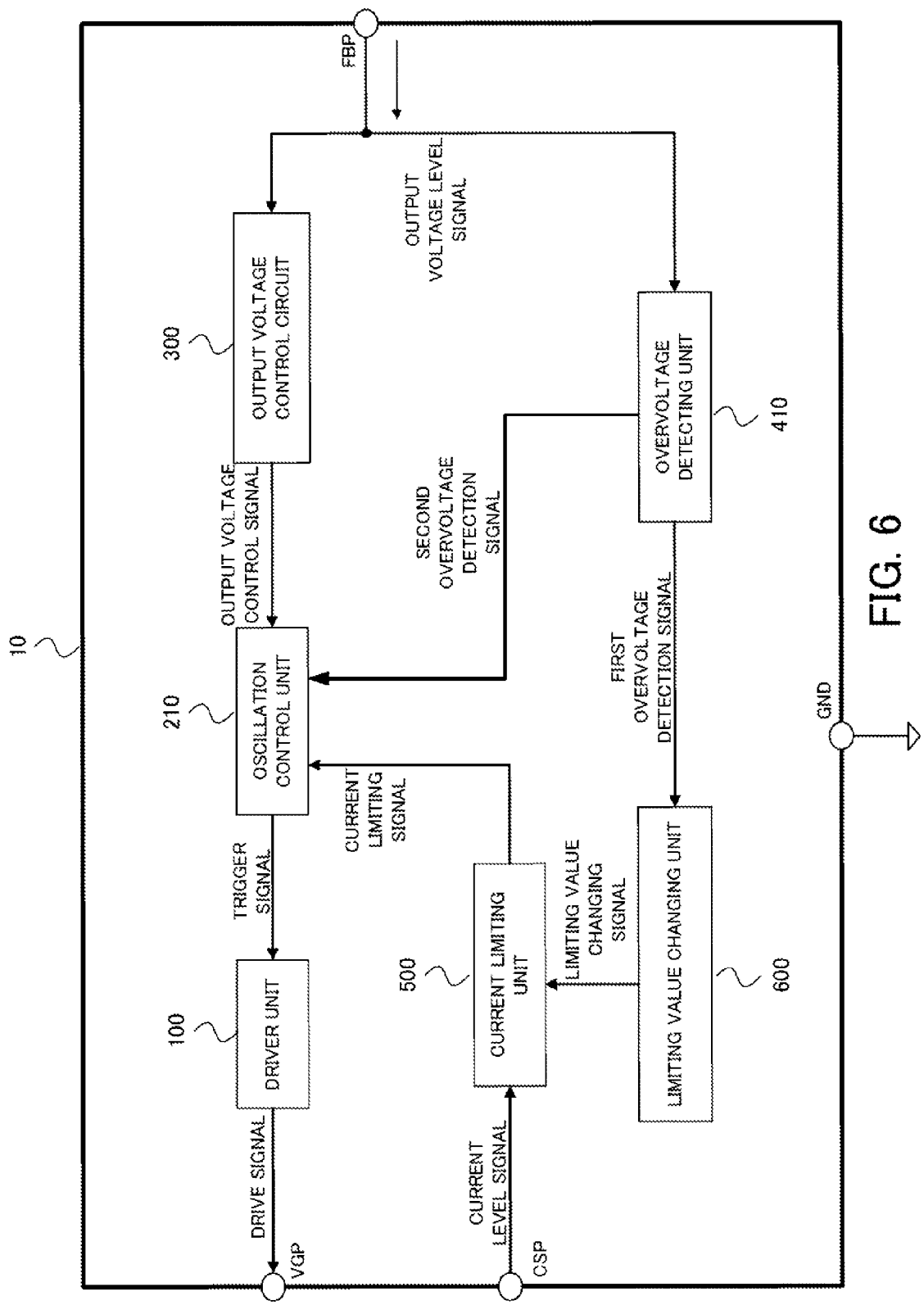
FIG. 6 is a peripheral circuitry block diagram of an overvoltage detecting unit, a current limiting unit, and a limiting value changing unit in the control circuit according to the second embodiment.
Figure 7:
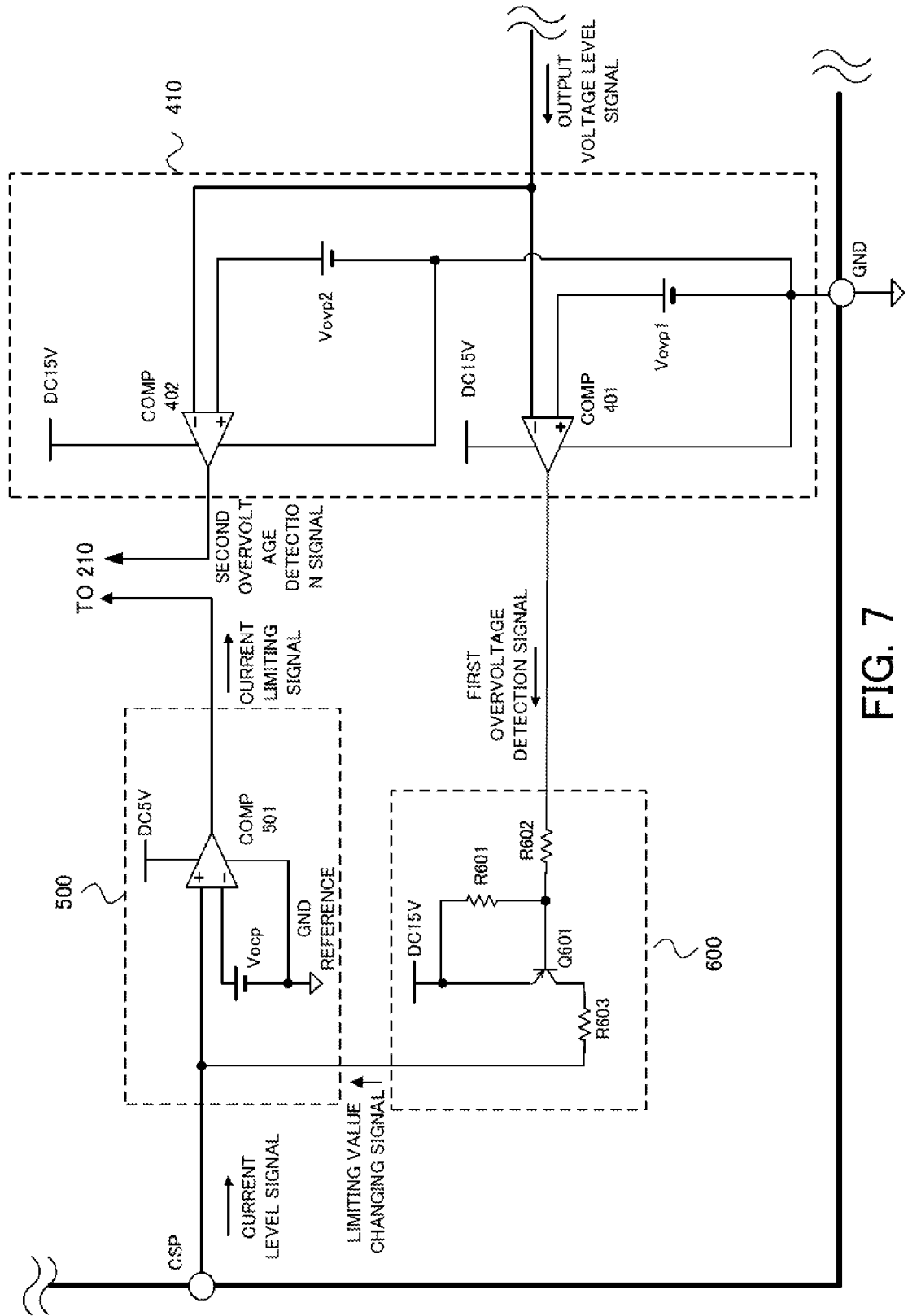
FIG. 7 is a peripheral circuitry configurational diagram of an overvoltage detecting unit, a current limiting unit, and a limiting value changing unit in the control circuit according to the second embodiment.

Referring to FIG. 6, the control circuit 10 according to this embodiment is provided with the driver unit 100, an oscillation control unit 210, the output voltage control circuit 300, an overvoltage detecting unit 410, the current limiting unit 500, and the limiting value changing unit 600. It should be noted that components denoted by the same reference numerals as those in the first embodiment have the same functions as those in the first embodiment, and therefore detailed descriptions for such components shall be omitted.

The overvoltage detecting unit 410 is provided with the functions of being supplied with the output voltage level signal corresponding to the capacitor charge voltage of the output capacitor C4 from the FBP terminal, detecting that the inputted output voltage level signal is at the second voltage value that is higher than the first voltage value, generating a first overvoltage detection signal, and supplying the overvoltage detection signal to the limiting value changing unit 600, and in addition configured to detect the third voltage value that is higher than the second voltage value, generate a second overvoltage detection signal, and supply the second overvoltage detection signal to the oscillation control unit 210.

The oscillation control unit 210 controls to stop oscillation when the second overvoltage detection signal is inputted.

<Circuit Configurations of Main Components within Control Circuit>

Circuit configurations of main components within the control circuit according to this embodiment will be described with reference to FIG. 7. The circuit configurations of the main components (the overvoltage detecting unit 410, the current limiting unit 500, and the limiting value changing unit 600) within the control circuit 10 according to this embodiment areas illustrated in FIG. 7. It should be noted that components denoted by the same reference numerals as those in the first embodiment have the same functions as those in the first embodiment, and therefore detailed descriptions for such components shall be omitted.

The overvoltage detecting unit 410 is provided with a first circuit block including the comparator COMP 401 and a third voltage source Vovp1 corresponding to the second voltage value, and a second circuit block including a comparator COMP 402 and a fourth voltage source Vovp2 corresponding to the third voltage value.

Here, a negative input terminal of the comparator COMP 402 within the second circuit block is connected to the FBP terminal of the control circuit 10, and supplied with the output voltage level signal. A positive input terminal of the comparator COMP 402 is connected to the fourth voltage source Vovp2. Further, an output terminal of the comparator COMP 402 generates a Low-level second overvoltage detection signal when the output voltage is higher than the third voltage value, and outputs this signal to the oscillation control unit 210.

Therefore, according to this embodiment, the overvoltage detecting unit detects the third voltage value when the capacitor charge voltage of the output capacitor reaches the third voltage value higher than the second voltage value, and controls the oscillation control unit to discontinue and hold the switching of the switching element. Thus, even when the output voltage is in the overshoot state and increases up to the third voltage value, it is possible to stop the power factor correction circuit reliably and easily.

Third Embodiment

The third embodiment of the present invention will be described with reference to FIG. 5 and FIG. 8. It should be noted that according to this embodiment, a limiting value change end signal indicating that the change of the limiting value has ended is transmitted to a load side at timing when the state in which the limiting value changing unit causes the current limiting unit to change the limiting value resumes to a state before the change.

<Configurational Blocks within Control Circuit>

Configurational blocks of the control circuit according to this embodiment will be described with reference to FIG. 8.

Figure 8:
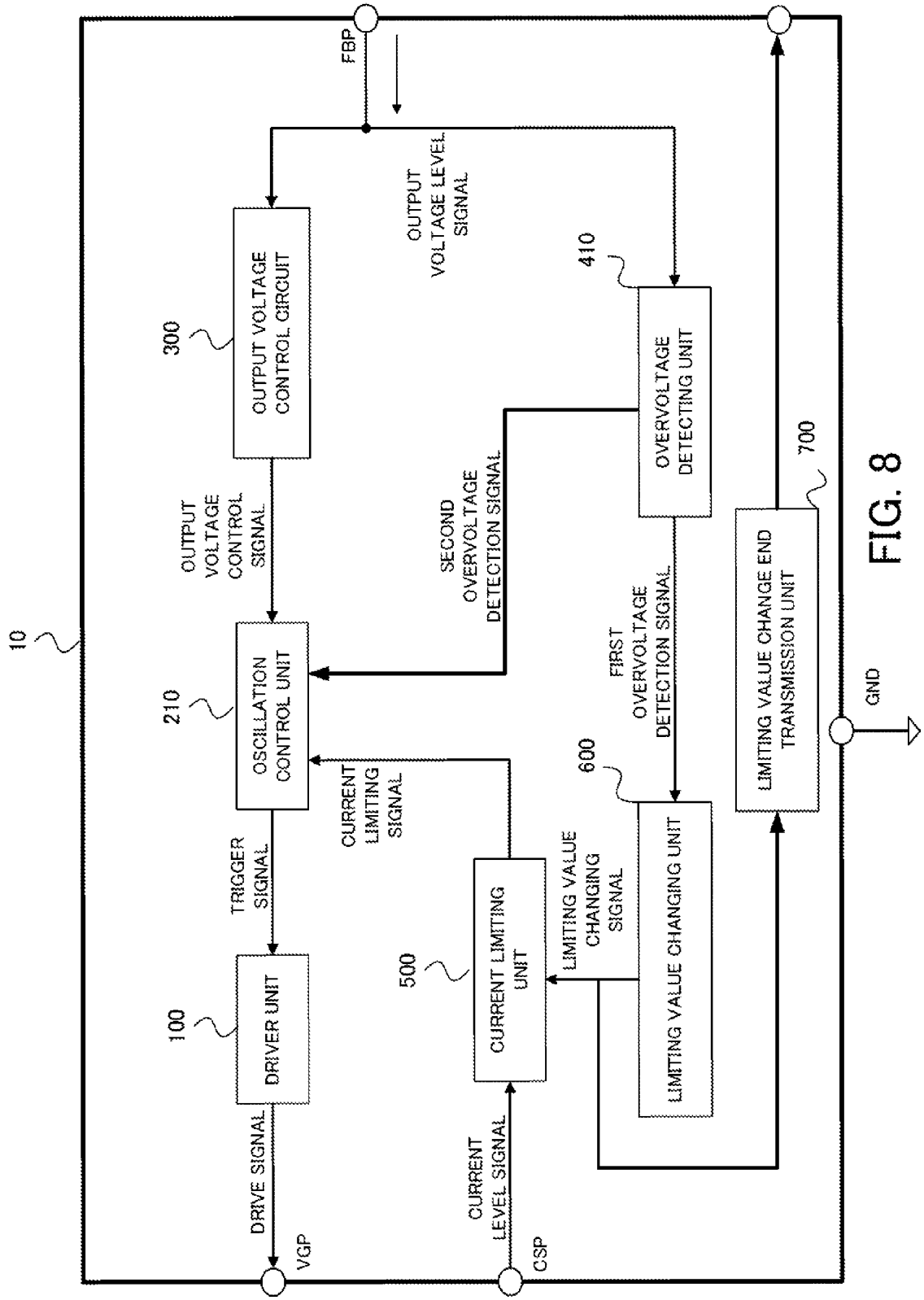
FIG. 8 is a peripheral circuitry block diagram of an overvoltage detecting unit, a current limiting unit, and a limiting value changing unit in the control circuit according to the third embodiment.
Figure 9:
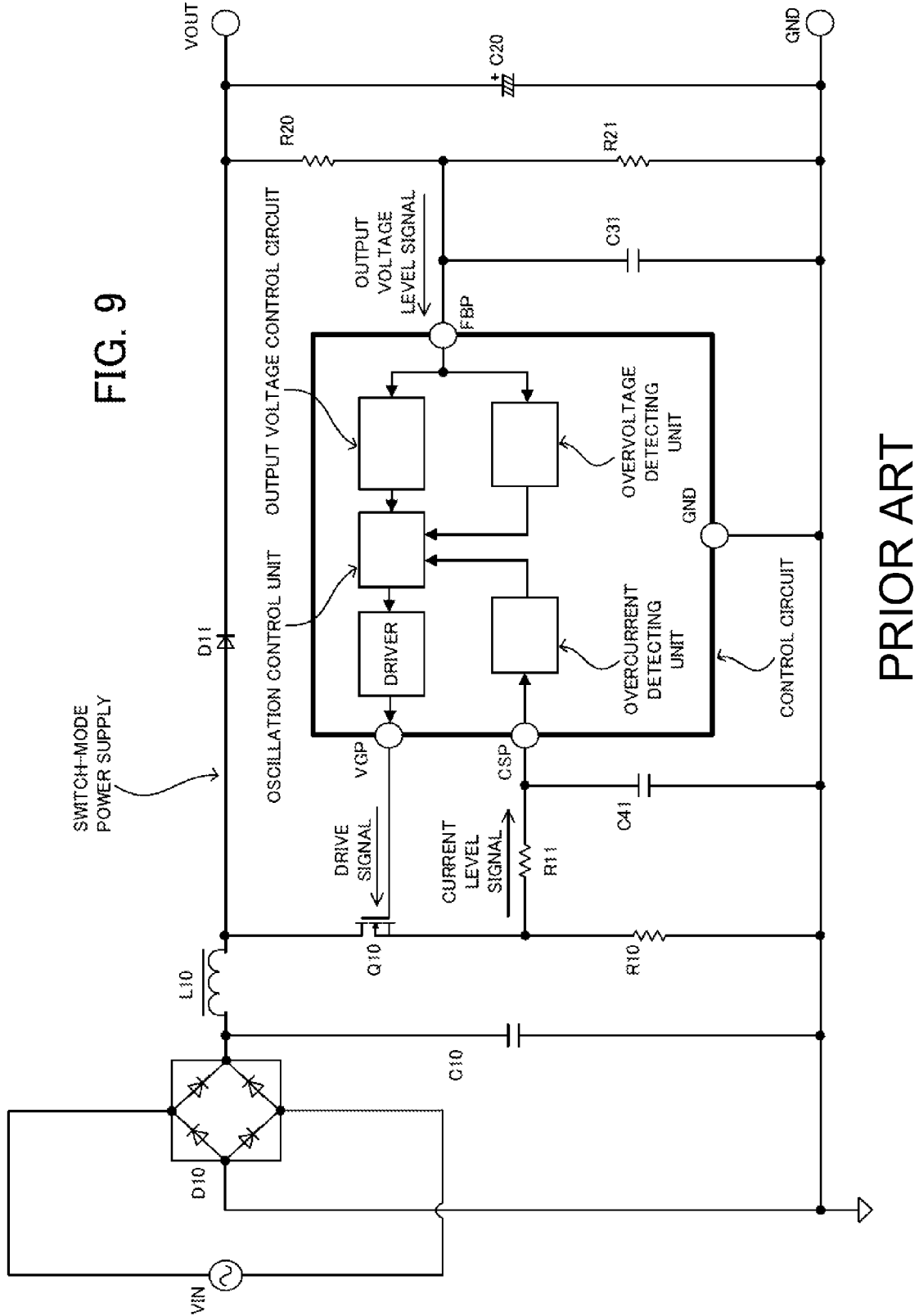
FIG. 9 is a diagram illustrating a circuit configuration of a power factor correction circuit according to a conventional example.
Figure 10:
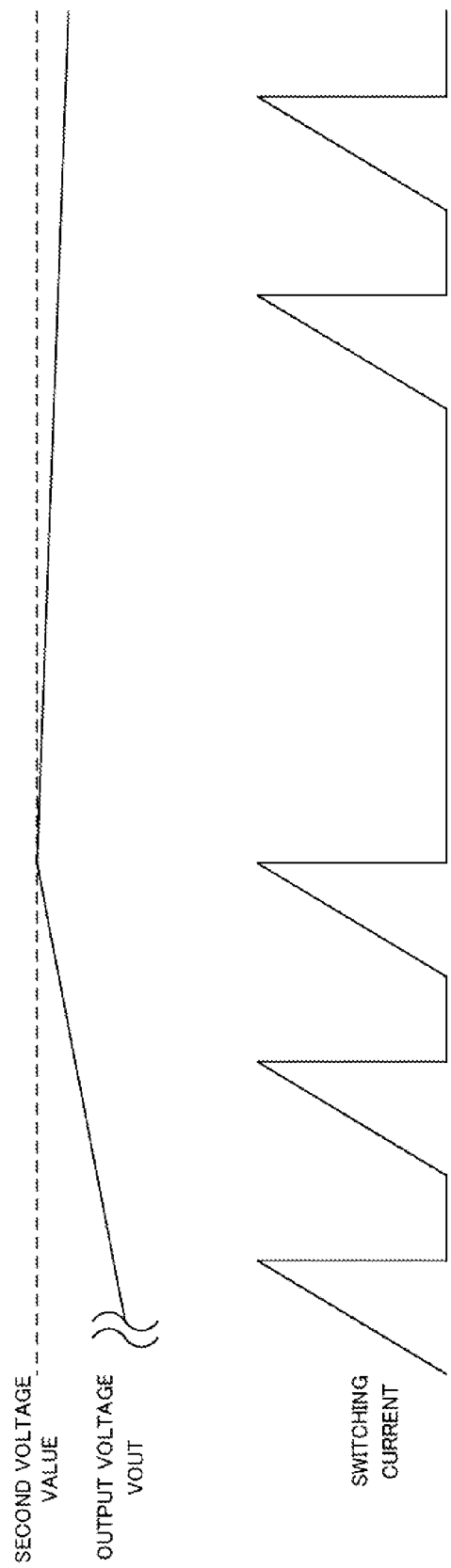
FIG. 10 is an operational timing chart when activating the power factor correction circuit according to according to the conventional example.
Figure 11:
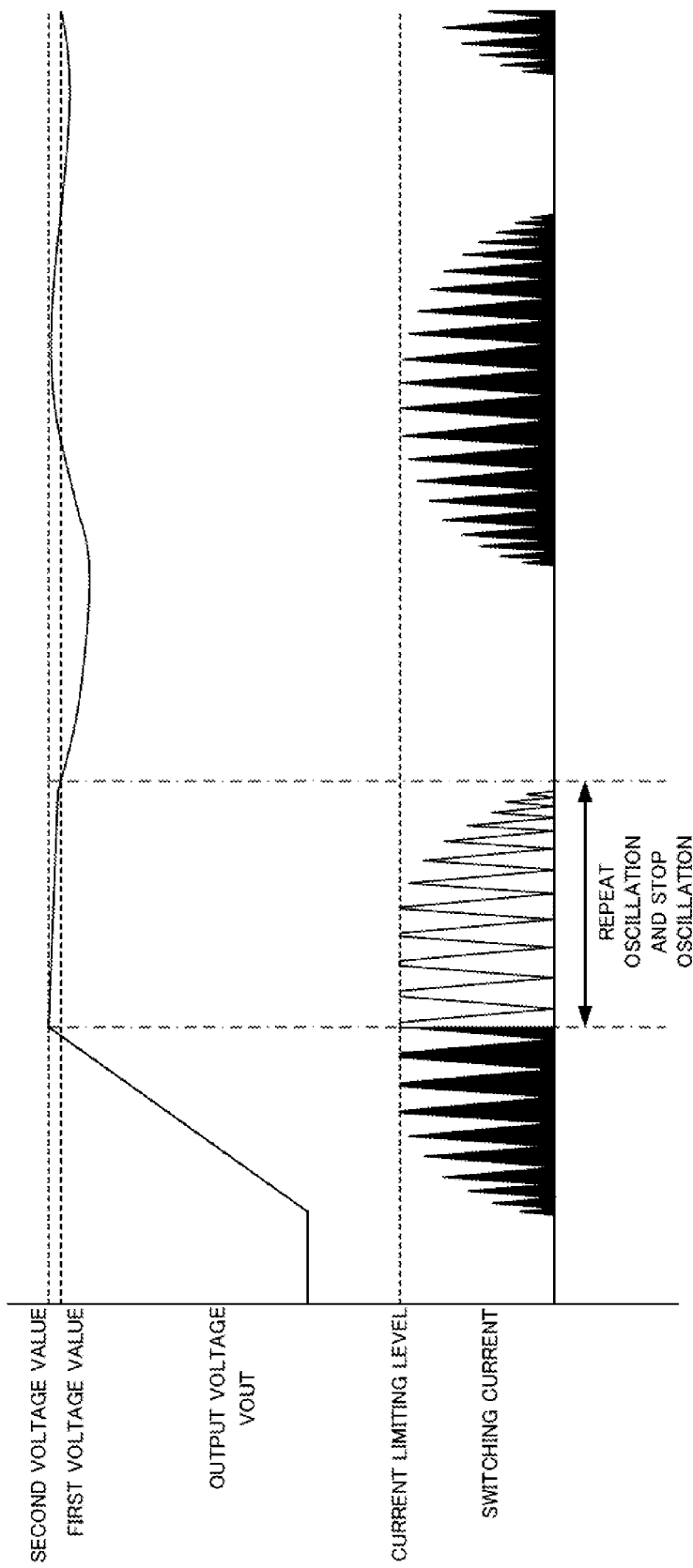
FIG. 11 is a timing chart showing the timing chart in FIG. 10 in a wider timeline.

Referring to FIG. 8, the control circuit 10 according to this embodiment is provided with the driver unit 100, the oscillation control unit 210, the output voltage control circuit 300, the overvoltage detecting unit 410, the current limiting unit 500, the limiting value changing unit 600, and a limiting value change end transmission unit 700. It should be noted that components denoted by the same reference numerals as those in the second embodiment have the same functions as those in the second embodiment, and therefore detailed descriptions for such components shall be omitted.

The limiting value change end transmission unit 700 transmits a limiting value change end signal indicating that the change of the limiting value has ended to a load side at timing when the state in which the limiting value changing unit 600 causes the current limiting unit 500 to change the limiting value resumes to the state before the change.

Specifically, for example, as illustrated in FIG. 5, a falling edge of the limiting value changing signal is detected, and a limiting value change end detection signal whose logic is shifted from High level to Low level is generated and transmitted to the load side.

Therefore, according to this embodiment, the limiting value change end signal indicating that the change of the limiting value has ended is transmitted to the load side at the timing when the state in which the limiting value changing unit causes the current limiting unit to change the limiting value resumes to the state before the change. Accordingly, as the information that the current limiting level of the switching current is limited to the limiting value is transmitted to the load side, when another electric circuit is connected to the output of the power factor correction circuit according to the present invention, for example, it is possible to prohibit the operation of this electric circuit even when the output voltage of the power factor correction circuit is not stably constant voltage-controlled at the first voltage value, by controlling an operation of the electric circuit based on the limiting value change end information.

As described above, the embodiments of the present invention has been described with reference to the drawings. However, specific configurations shall not be limited to these embodiments, and include designs and such without departing the scope and the spirit of the invention.

REFERENCE MARKS IN THE DRAWINGS

1 Power Factor Correction Circuit
10 Control Circuit
20 Rectifier Circuit
30 Output Voltage Setting Circuit
100 Driver Unit
200 Oscillation Control Unit
210 Oscillation Control Unit
300 Output Voltage Control Circuit
400 Overvoltage Detecting Unit
410 Overvoltage Detecting Unit
500 Current Limiting Unit
600 Limiting Value Changing Unit
700 Limiting Value Change End Transmission Unit
C1 Capacitor
C2 Capacitor
C3 Capacitor
C4 Capacitor
COMP 401 Comparator
COMP 402 Comparator
COMP 501 Comparator
D1 Bridge Rectifier Circuit
D2 Diode
L1 Choke Coil
Q1 Switching Element
Q601 Transistor
R1 Resistance
R2 Resistance
R3 Resistance
R4 Resistance
R601 Resistance
R602 Resistance
R603 Resistance
VIN Commercial Power Source
Vocp Reference Voltage Source
Vovp Second Voltage Source
Vovp1 Third Voltage Source
Vovp2 Fourth Voltage Source

The invention claimed is:

1. A power factor correction circuit comprising:
an input diode configured to rectify commercial input power;
a choke coil having one terminal connected to the input diode;
an output diode having an anode terminal connected to the other terminal of the choke coil;
an output capacitor having a positive terminal connected to a cathode terminal of the output diode;
a switching element connected between a contact point and a negative terminal of the output capacitor, the contact point locating between the anode terminal of the output diode and the other terminal of the choke coil; and
a control circuit configured to control turning on and off of the switching element,
wherein a voltage of the commercial input power is boosted, a direct voltage from the output capacitor is outputted, and electricity is supplied to a load side, and
the control circuit includes:
an output voltage control circuit configured to perform constant voltage-control so that a capacitor charge voltage of the output capacitor may be a first voltage value;
an overvoltage detecting unit configured to detect a second voltage value to generate a first overvoltage detection signal, when the capacitor charge voltage of the output capacitor reaches the second voltage value higher than the first voltage value;
a current limiting unit configured to detect a value of a switching current through the switching element, determine a limiting value of a level of the switching current, and limit the value of the switching current to the limiting value; and
a limiting value changing unit configured to output a limiting value changing signal to cause the current limiting unit to change the limiting value to decrease the level of the switching current based on the first overvoltage detection signal when the overvoltage detecting unit has detected the second voltage value, and
wherein the current limiting unit changes the limiting value based on a signal obtained by superimposing a current level signal corresponding to the value of the switching current and a limiting value changing signal outputted from the limiting value changing unit for causing the current limiting unit to change the limiting value.

2. The power factor correction circuit according to claim 1, wherein when the overvoltage detecting unit detects that the capacitor charge voltage of the output capacitor is higher than the second voltage value after the overvoltage detecting unit has detected the second voltage value, the limiting value changing unit causes the current limiting unit to change the limiting value so as to further decrease the value of the switching current to be lower than the value of the switching current caused to decrease when the overvoltage detecting unit detects the second voltage value.

3. The power factor correction circuit according to claim 2, wherein the current limiting unit is constituted by a comparator having: a negative terminal connected to a reference power source corresponding to the first voltage value; an output connected to an oscillation control unit configured to control oscillation of the switching element; and a positive terminal supplied with a signal obtained by superimposing the current level signal corresponding to the value of the switching current and the limiting value changing signal outputted from the limiting value changing unit for causing the current limiting unit to change the limiting value.

4. The power factor correction circuit according to 1, wherein the control circuit includes an oscillation latch unit configured to discontinue and hold a switching operation of the switching element, when the capacitor charge voltage of the output capacitor reaches a third voltage value higher than the second voltage value, the overvoltage detecting unit detects the third voltage value to generate a second overvoltage detection signal, and the oscillation latch unit discontinues and holds the switching of the switching element based on the second overvoltage detection signal.

5. The power factor correction circuit according to claim 1, wherein the control circuit includes a limiting value change end transmission unit configured to transmit a limiting value change end signal to the load side at timing when a state in which the limiting value changing unit has caused the current limiting unit to change the limiting value resumes to a state before the change, the limiting value change end signal indicating an end of the change of the limiting value.

6. A power factor correction circuit comprising:
   an input diode configured to rectify commercial input power;
   a choke coil having one terminal connected to the input diode;
   an output diode having an anode terminal connected to the other terminal of the choke coil;
   an output capacitor having a positive terminal connected to a cathode terminal of the output diode;
   a switching element connected between a contact point and a negative terminal of the output capacitor, the contact point locating between the anode terminal of the output diode and the other terminal of the choke coil; and
   a control circuit configured to control turning on and off of the switching element, wherein
   a voltage of the commercial input power is boosted, a direct voltage from the output capacitor is outputted, and electricity is supplied to a load side, and
   the control circuit includes:
      an output voltage control circuit configured to perform constant voltage-control so that a capacitor charge voltage of the output capacitor may be a first voltage value;
      an overvoltage detecting unit configured to detect a second voltage value to generate a first overvoltage detection signal, when the capacitor charge voltage of the output capacitor reaches the second voltage value higher than the first voltage value;
      a current limiting unit configured to detect a value of a switching current through the switching element, determine a limiting value of a level of the switching current, and limit the value of the switching current to the limiting value; and
      a limiting value changing unit configured to cause the current limiting unit to change the limiting value to decrease the level of the switching current based on the first overvoltage detection signal when the overvoltage detecting unit has detected the second voltage value,
   wherein when the overvoltage detecting unit detects that the capacitor charge voltage of the output capacitor is higher than the second voltage value after the overvoltage detecting unit has detected the second voltage value, the limiting value changing unit causes the current limiting unit to change the limiting value so as to further decrease the value of the switching current to be lower than the value of the switching current caused to decrease when the overvoltage detecting unit detects the second voltage value, and
   wherein the current limiting unit is constituted by a comparator having: a negative terminal connected to a reference power source corresponding to the first voltage value; an output connected to an oscillation control unit configured to control oscillation of the switching element; and a positive terminal supplied with a signal obtained by superimposing a current level signal corresponding to the value of the switching current and a limiting value changing signal outputted from the limiting value changing unit for causing the current limiting unit to change the limiting value.

* * * * *